Nov. 11, 1952

A. WOLF 2,617,947

RECORDING

Filed March 28, 1947

INVENTOR.
ALEXANDER WOLF
BY
Daniel Stryker
ATTORNEY

Patented Nov. 11, 1952

2,617,947

UNITED STATES PATENT OFFICE 2,617,947

RECORDING

Alexander Wolf, Houston, Tex., assignor to The Texas Company, New York, N. Y., a corporation of Delaware Application March 28, 1947, Serial No. 737,918

4 Claims. (Cl. 250—83.6)

This invention relates to an instrument for recording the duration of an event together with the time at which the event takes or has taken place. More particularly the invention relates to an instrument for the determination and recordation of the intensity of radioactivity as detected by conventional radioactivity detectors.

Radioactivity is conveniently detected by means of gamma ray detectors. Gamma ray intensities may be measured by means of an ionization chamber type of counting instrument in which a current flow is induced proportional in magnitude to the primary ionization produced in the chamber by incident gamma rays. There are other types of instruments well known in the art for the measurement of radiation which are based on the count of the individual incident rays. In such instruments primary ionization produced in a gas filled chamber by an incident gamma ray initiates a large transitory electrical discharge. These discharges are amplified and counted and the count observed per unit time is proportional to the frequency of the incident rays.

Such detecting instruments do not deliver continuous current but rather a series of sharp current pulses at an average rate which depends on the intensity of the radioactivity to which the detector is exposed. If the intensity of radioactivity varies with time, as is frequently the case, it is desirable to obtain a continuous record of this intensity. This has been accomplished in prior practice by recording each individual pulse as a mark on a strip. The interpretation of such a record is tedious, because it requires the counting of the number of pulses produced during successive time intervals. It has been proposed to reduce the labor involved in counting these pulses by employing a "scale circuit" which automatically counts a predetermined number of pulses and in turn produces only one pulse for the above predetermined number of pulses. However, even with this scale circuit, the interpretation of a record cannot be made at a glance.

An additional proposal for obtaining a continuous record from the individual pulses of a radiation detector involves an "integration circuit," which as the name implies, integrates the pulses and thereby produces a continuous voltage, the magnitude of which is approximately proportional to the number of pulses received during some predetermined previous time interval. The inherent difficulty with this type of circuit arises from the fact that the output voltage depends on the characteristics of the various vacuum tubes employed in the circuit. When an instrument of this type operates for relatively long periods, the aging of the vacuum tubes results in gradual changes in their characteristics which in turn results in a drift in the readings obtained with a given intensity of radioactivity. So calibration difficulties arise.

The instant invention (although applicable generally to the recording of the duration of an event together with the time at which the event occurred) is concerned primarily with measurement and recording of variations in the intensity of radioactivity with time while avoiding the difficulties outlined above. The invention provides apparatus that is not susceptible to drift and which does not require frequent calibration. It permits the elimination of an integration circuit, and in its preferred form permits power line frequency to be employed as its primary reference standard. In modern operations, such frequency is maintained extraordinarily constant.

Basically, the invention contemplates a chart traveling responsive to time, a marker (hereinafter called a pen) mounted adjacent the face of the chart and driven transversely to the chart at a greater rate of linear velocity than the chart, means for initiating the movement of the pen transversely to the chart responsive to the commencement of a given event, means for stopping the movement of the pen responsive to the completion of the event and automatic means for returning the pen to its starting position.

As employed in the measurement of radio activity the apparatus of the invention comprises the chart and pen, together with electrical means in association with a detector of radioactivty, the electrical means being adapted to deliver an output voltage only after activation by a fixed number of pulses from the detector, means for initiating the transverse movement of the pen simultaneously with the commencement of the activation of the electrical means, means for stopping the movement of the pen responsive to the appearance of the output voltage from the electrical means, means for returning the pen to its original position and means responsive to the return of the pen to its original position for resetting the electrical means so that the output voltage will again appear only after activation of the electrical means by a like number of pulses from the detector.

The invention may be more readily understood from the following detailed description taken in conjunction with the accompanying drawing in which.

Figure 1:
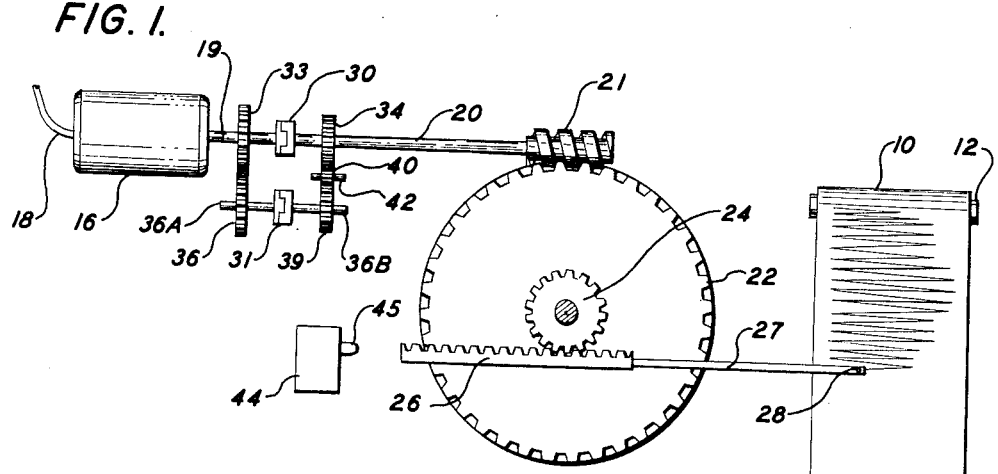
Fig. 1 is a schematic diagram of one recording apparatus of the invention.

The recording mechanism shown in Fig. 1, comprises a chart 10 mounted on suitable rollers 12, 13 which are driven in conventional manner to cause the chart 10 to move at a constant speed.

The mechanism has a synchronous motor 16 which is connected to a power line 18 and runs continuously during operation. The motor turns a shaft 19, which is coupled at its right hand end to a clutch arrangement. This comprises a first magnetic clutch 30 mounted directly on the end of the motor shaft and connected directly to a coaxial extension shaft 20, and a second magnetic clutch 31 disposed parallel to the first on a jack shaft 36A and driving a coaxial sub-shaft 36B. A rigidly mounted gear 33 on the motor shaft 19 meshes with a gear 36 rigidly mounted on the jack shaft and thus drives the second clutch. This in turn drives a gear 39 on the sub-shaft 36B and, meshing with a gear 34 rigidly mounted on the extension shaft 20, transmits power to the latter.

The clutch arrangement permits the shaft 20 to be turned either clockwise or counter-clockwise, depending upon which of its two clutches is engaged, it being apparent of course, that only one clutch should be engaged at one time.

The shaft 20 carries a rigidly mounted worm at its right hand end. The worm meshes with a sprocket 22 rotatable on an axis perpendicular to those of the rotatable parts thus far described and turning a coaxial pinion 24 that engages a rack 26 and moves it to the right or left, as viewed in Fig. 1, depending upon the direction of rotation of the shaft 20 upon which the worm is mounted.

The rack has a longitudinal extension arm 27 having a pen 28 on its right hand end in engagement with the chart and adapted to move to the right or left thereon under the impetus of the linkages thus far described.

A limit switch 44 is disposed to the left of the rack 26 and in the path thereof, so that it is operated when the rack moves sufficiently far in its direction, i. e. to the point of engagement with its button 45.

Figure 2:
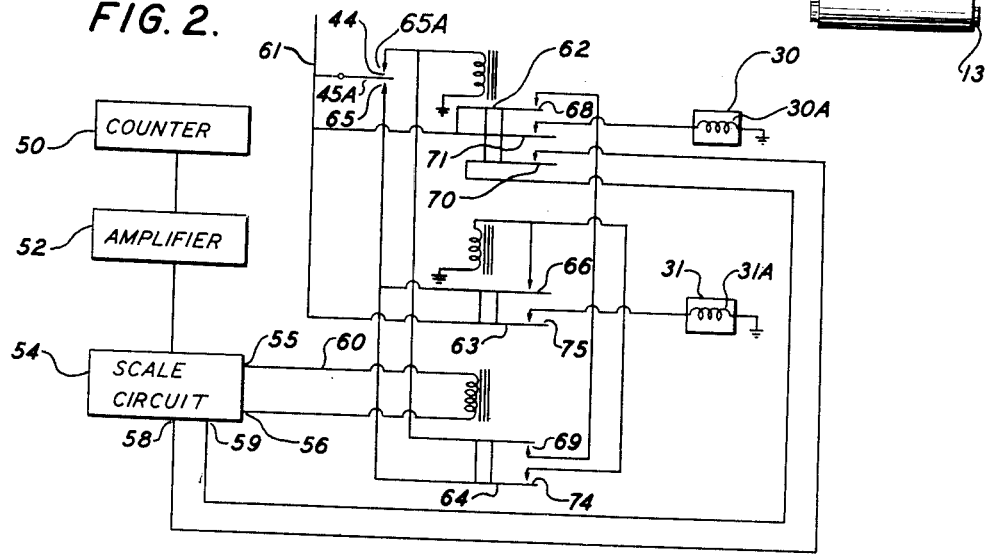
Fig. 2 is a diagrammatic representation of the circuit employed with the recording means of Fig. 1, for the purposes of measuring and recording radio activity.

The functioning of the limit switch 44 with respect to the recording apparatus is more clearly described with relation to Fig. 2, which is a diagram of the circuit employed to operate the recorder of Fig. 1 and includes apparatus necessary for the determination and recording of radioactivity. Referring to Fig. 2, a counter 50 (which may be any conventional apparatus for the detection of radioactivity such, for example, as those already mentioned) is connected to and operates an amplifier 52 which may include the necessary quench circuit, pulse equalizer, etc., devices which are familiar in the art. Such circuits in amplifiers have been described in detail in the literature, for instance in, "Procedures in Experimental Physics," by John Strong, published by Prentice Hall Inc., N. Y. The output of the amplifier 52 is fed to a "scale circuit" 54 of conventional type, for example that described on page 288 of the aforementioned text by Strong. The scale circuit consists of a series of flip flop trigger circuits so arranged that a predetermined number of pulses have to be fed into the input side of the scale circuit before a voltage appears across output terminals 55 and 56. The number of pulses which must be fed into the input of the scale circuit before a voltage appears across the output terminal depends upon the number of stages built into the scale circuit. Ordinarily this number is a power of 2, such as 2, 4, 8, 16, ... 256, 512, 1024, 2048, etc. After the predetermined number of pulses have been fed to the input of the scale circuit, and the voltage has appeared across its output terminals, the circuit can be so arranged that current will continue to flow in the output circuit until the entire scale circuit or a portion of it is de-energized or "reset." This deenergization is accomplished by breaking a contact 70 in a circuit between two external terminals 58, 59. These terminals are for the purposes of description termed "reset" switch terminals. When the reset switch contact 70 is actuated, the scale circuit will proceed again with its operation until the same number of pulses is fed into the input, at which time the voltage will appear across the output terminals 55 and 56 and current will flow through the output circuit 60 until such time as the reset switch is again operated.

The clutches 30 and 31 are controlled by the scale circuit 54 through relays 62, 63, 64 and the limit switch 44 connected in the output of the circuit. These relays are operated on the one hand by the limit switch 44 whenever it is actuated by the rack 26 as described with reference to Fig. 1, and on the other hand by the appearance of the output voltage on the scale circuit 54. In the operation of the circuit of Fig. 2, which is cyclic in nature and thus continuous, a switch arm 45A of the limit switch 44 is thrown in contact with a terminal 65A when the rack 26 presses on the switch plunger 45 as described with reference to Fig. 1. It is thrown into contact with another terminal 65 after the rack has started traveling toward the right and has released the button 45.

Since the operation of the apparatus is cyclic and thus continuous, for the purposes of description it is most convenient to start at an arbitrary period in the operational cycle and proceed through the entire cycle until the original condition has been achieved. For purposes of this description, it may be assumed that at one particular period in the cycle the limit switch 44 is in contact with the terminal 65 which thereby connects the relay 63 with the power input line 61 through a locking contact 66 while relays 62 and 64 are open. At this stage of the cycle, a solenoid operation coil 30A (of the clutch 30) connected across the open relay 62 is not energized, and the reset terminals 58 and 59 connected across the relay 62 are open so that the scale circuit 54 is inoperative. A solenoid operation coil 31A of the clutch 31 is connected across the relay 63 and at this stage is closed. Consequently, the pen 28 shown in Fig. 1 is pulled to the left by means of the rack 26.

When the rack strikes the limit switch button 45, the switch arm 45A is thrown into contact with the terminal 65A, whereupon the relay 63 is opened and the relay 62 is closed and is locked in the closed position by locking contacts 68, 69, the contact 69 being closed when the relay 64 is open. As a consequence of opening the relay 63, the clutch 31 is de-energized so that the pen 28 stops traveling to the left. As a consequence of closing the relay 62, the reset terminals 58, 59 are closed through the contact 70, so that the scale circuit starts operating. At the same time the clutch 30 is energized by the relay 62 through the contact 71 so that the worm 21, shown in Fig. 1, is rotated in the opposite direction causing the pen to travel across the chart away from the limit switch. As soon as the rack 26 releases the button of the limit switch 44, the switch arm 45A drops back to contact the terminal 65. This has no immediate effect, inasmuch as the relay 62 is locked in the closed position by the contacts 68, 69, as already described.

The travel of the pen 28 across the chart 10 in the right hand direction will continue until the counter 50 has delivered the required number of pulses to the scale circuit 54. When this happens a voltage will appear across the output terminals 55, 56, and this will energize the relay 64 through the circuit 60. When the relay 64 is energized, the contact 69 is opened, thereby opening the relay 62, whereupon the contact 74 is closed to energize the relay 63. As a consequence of the opening of the relay 62, the clutch 30 is released and the pen stops moving to the right. At the same time the contact 70 of the relay 62 is opened and thereby de-energizes the scale circuit which in turn opens the relay 64.

Simultaneously with the de-energization of relay 64, relay 63 is closed and locked in the closed position through the contact and therefore remains closed even after the de-energization of the relay 64.

The closing of the contact 75 by the energization of the relay 63, actuates the clutch 31 so that the pen starts moving to the left and the apparatus has returned to the original condition.

The foregoing operation will continue to repeat itself indefinitely and the pen 28 will trace the saw toothed curve shown on the chart 10 in Fig. 1, the amplitude of the curve being a measure of the intensity of the radioactivity.

To insure proper operation, the relays should, of course, be adjusted properly with respect to each other. Thus relays 62 and 63 should operate almost simultaneously and the release time of the relay 64 should be greater than the closing time of relay 63 in order to permit the closing of the relay 63 prior to the de-energization of relay 64.

In further explanation, the function of the contact 69 is to break the power supply circuit to the coil of the relay 62 at the instant when the scale circuit has reached a predetermined value and has produced current through the winding of the relay 64 and thereby operated it. This opens the contact 69 and deenergizes the relay 62, which in turn deenergizes the clutch 30 by opening the contact 71 of the relay 62. When this occurs the travel of the pen 28 toward the right is stopped. Simultaneously the opening of the relay 62 breaks the contact at 70 and thereby deenergizes the scale circuit. This cuts off the current to the coil of relay 64 and allows it to drop open. Actually the relay 64 is operated only momentarily. However, during this period of momentary operation of the relay 64, the contact 74 is closed—thereby supplying power to the coil of the relay 63. Such a supply of power causes the relay 63 to operate and to close the contact 66 providing an auxiliary path independent of the contact 74 by which the relay 63 may be maintained in an energized condition, i. e. locked, so that it will not fall open when the relay 64 falls open on deenergization of the scale circuit. The closing of the relay 63 also supplies power to the clutch 31 through the contact 75 and thus starts the pen in its travel toward the left. To summarize, it might be said that the contact 69 is the unlocking contact for the relay 62 while the contact 68 is the locking contact for the relay 62. The contact 66 is the locking contact for the relay 63. The function of the relay 64, among others, is to reverse the travel of the pen from right to left and the function of the limit switch 44 is to reverse the travel of the pen from left to right. It should be noted that the relays 62, 63 have a locking contact and an unlocking contact. The locking contact for the relay 62 is the contact 68. The unlocking contact for the relay 62 is the contact 69. The locking contact for the relay 63 is the contact 66 and the unlocking contact for the relay 63 is the contact 65.

In many applications the intensity of radioactivity varies by only a small fraction of its average value. In such case it becomes desirable to record only a small part of the motion of the rack 26. This is accomplished by a modification of the apparatus illustrated in Fig. 3.

Figure 3:
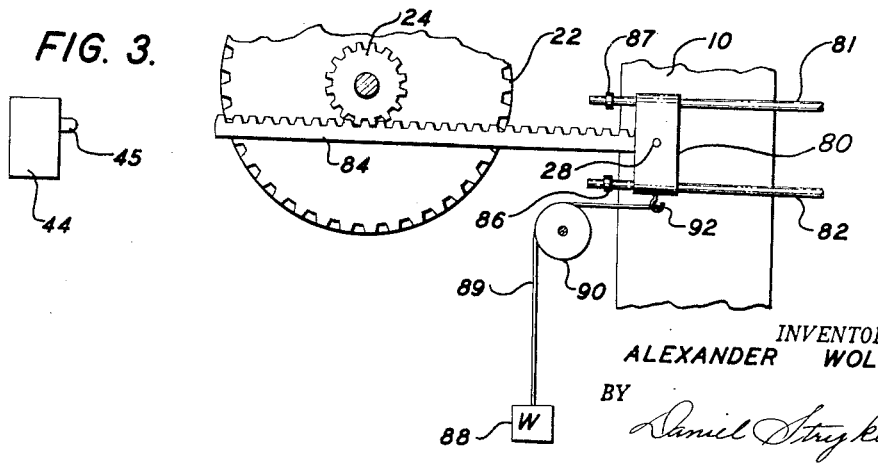
Fig. 3 is a modified form of the recording means of Fig. 1, adapted to be operated in conjunction with the circuit of Fig. 2, and to record only the maxima of the observed intensity.

In Fig. 3, which is a partial view of a modification of the apparatus of Fig. 1, the pen 28 is mounted on a carriage 80 which travels transversely to the chart 10 along parallel guide rods 81, 82. A rack 84 generally similar to the rack 26 of the apparatus of Fig. 1, is provided and differs from the other rack only in increased length. The limit switch 44 is the same as the limit switch 44 in Fig. 1, but is placed farther to the left of the rack 84 than in the other embodiment. When the rack 84 is in its extreme left hand position, the pen carriage is brought against stops 86, 87 on the guide rods 81, 82 by means of a weight 88 connected thereto by a cable 89 which travels over a pulley 90. The cable 89 is affixed to the carriage 80 by a hook 92. (Movement of the carriage 80 toward the left may be accomplished by a spring or other means which will perform the same function as the weight 88.)

The rack 84 (which is reciprocated in the same manner as that of Fig. 1) engages the pen carriage 80 somewhere in the mid stroke of the rack so that only a portion of its travel is actually recorded. By this means it is unnecessary to have a chart as wide as the full travel of the rack.

It is also within the contemplation of the invention to employ a circular chart instead of the ribbon type illustrated. Such a circular chart can be readily adapted to the recording apparatus of the present invention by providing a linkage between the pen and the rack of a type which permits the pen to pursue a proper course on the circular chart.

To summarize the operation of the apparatus of the invention, the average frequency of the pulses from the counter 50 depends on the intensity of the radioactivity being measured (say the gamma radiations encountered along a well bore), and therefore the time required for the scale circuit to trip, i. e., for a voltage to appear across the output terminals 55, 56, likewise depends on this intensity. The higher the intensity, the shorter the time which will elapse between the reclosing of the reset switch through the terminals 58 and 59 and the tripping of the scale circuit output. It is this time which is measured and recorded by the recording device of the invention. The motor 16 drives the worm 21 in either direction depending on which clutch is energized. The worm 21 in turn drives the gear 22 attached to the pinion 24, which in turn drives the rack 26 (or the rack 84 as shown in Fig. 3). Thus, when the clutch 30 is energized the rack 26 is driven to the right.

As above shown, the clutch 30 is energized during the period in which the scale circuit is operating and before the output voltage appears across the terminals 55, 56. Thus the rack 26 will travel to the right until this output voltage appears across the output terminals of the scale circuit 54 and the length of the lines formed on the chart are a measure of the time required for this output voltage to appear, this time being inversely proportional to the intensity of the radiation registering on the counter 50. Hence the length of the line drawn on the chart 10 will be inversely proportional to the intensity of the radiation.

When the output voltage does appear across the terminals 55 and 56 of the scale circuit 54, the clutch 30 is de-energized (i. e. released) and the clutch 31 is energized (i. e. engaged) causing the rack 26 to travel toward the left instead of toward the right. When the rack 26 reaches the left hand extremity of the permissible travel it operates the limit switch 44, releases the clutch 31 and engages the clutch 30 at the same time resetting the scale circuit so that it will again receive a predetermined number of pulses from the counter 50 prior to the appearance of a voltage across the output terminals 55 and 56. The time required will be proportional to the intensity of the radiation being received at that particular time by the counter 50.

It is apparent that by means of the apparatus of the invention one may obtain a continuous picture of the intensity of radiation at any given time and by drawing a curve through the maximum points on the graph formed on the chart 10, may obtain a picture of the fluctuation in the intensity with time.

The apparatus described is applicable to the determination of the duration and the time of any given event and is not restricted to use for the determination of the intensity of radioactivity. In this additional capacity, the apparatus of the invention becomes in effect an operation time recorder. Conventional instruments for accomplishing this same function effect the measurement of the time duration along the longitudinal axis of a chart and for this reason are limited in their application. They are not capable, practically, of measuring times which are very short, say one minute or less, because of the excessive chart speeds which would be required. The instrument of present invention is particularly adapted to measuring the duration of the operation of a device where such duration is short, say a minute or less, since it utilizes the tranverse dimensions of the chart for recording the duration of an operation and the longitudinal dimensions thereof only for recording when the operation is performed.

For employing the recorder of the invention for this last named purpose, the circuit shown in Fig. 2 need only to be modified so that the clutch 30 will be energized while the device in question is operating and the clutch 31 will be energized when the operation of the device has terminated, so as to return the pen 28 back to the original starting position—where it is ready to register another operation whenever the clutch 30 is again energized.

Many modifications in the apparatus of the invention may occur to those skilled in the art. Thus the gear train operated by the synchronous motor 16 may be so designed that the movement of the pen to the left is more rapid than the movement to the right, making it possible to utilize a greater portion of the total time for the actual measurement. Similarly the two clutches may be replaced by other means for alternately rotating the shaft 20 in one direction or another. Thus, the starting, stopping and reversing of the shaft can readily be accomplished by means of two brakes. Such a system has been used in the conventional differential transmission of older model automobiles.

It may be desirable to include an additional limit switch to prevent the overtravel of the pen 28 to the right. Such a switch can be employed either to stop the mechanism entirely or to apply a voltage across the output terminals of the scale circuit which would automatically reverse the motion of the pen.

The scale circuit need not include the excessive number of stages required for the large number of pulses which one might wish to count in some cases. It is within the contemplation of the invention to connect the output of such a scale circuit to a mechanical pulse counter and to employ an electrical contact attached to the pointer of the mechanical counter to operate the relay 64 at the end of one revolution of the pointer. In this fashion, the scale circuit may be employed to register an output voltage after say 256 counts, thereby move a mechanical counter one point. In short, the scaling of the circuit may be magnified by the incorporation of such a mechanical counter.

By addition of a pair of contacts to the relay 63, a stepping relay may be operated at the end of each right hand stroke of the pen 28. This stepping relay may be used to switch the input of the scale circuit or the input of the amplifier to a whole series of counters in succession. This makes possible measurement at a number of points with the same recording instrument. Of course, each maximum point on the curve would then refer to a different point of measurement in succession. The particular counter on which measurement is made can readily be identified, for instance, by the addition of a second pen connected mechanically to the stepping relay which would register on the chart a mark corresponding to the position of the stepping relay and thereby identify the counter from which a particular measurement comes. Similar mechanisms for recording a plurality of different measurements are found in use in temperature recording and the like, and means for indicating which particular quantity is being recorded at any given interval is familiar to those skilled in the art.

In an alternative embodiment, the apparatus of the invention may be so constructed that a separate recording element is associated with each counter, a common scale circuit and relay system being employed for all. In this embodiment the recording pen pertaining to any counter is inactive when measurements are being made on the other counter.

I claim:

1. An apparatus for recording the intensity of radio-activity which comprises a chart, means for driving the chart at a constant speed, a pen, means for moving the pen transversely to the chart, a detector for the radio-activity, electrical means in association with the detector delivering after setting an output voltage only after activation by a fixed number of pulses from the detector, means for initiating the movement of the pen simultaneously with the starting of said electrical means, means for stopping the movement of the pen responsive to the delivery of output voltage by the electrical means, means for returning the pen to its original position and means responsive to the return of the pen to its original position to reset the electrical means so that output voltage will again appear only after activation of the electrical means by the fixed number of pulses.

2. An apparatus for continuously recording the intensity of radioactivity which comprises a chart, means for driving the chart at a constant speed, a pen movable transversely to the chart, driving means for moving the pen in either direction transversely to the chart, a detector for the radioactivity, electrical means connected to the detector delivering after setting an output voltage only after activation by a fixed number of pulses from the detector, means for engaging the driving means with the pen simultaneously with the initiation of said electrical means, means for disengaging the driving means from the pen responsive to the delivery of said output voltage, means connected with said last named means for engaging the driving means with the pen so as to return the pen to its original position, and means responsive to the return of the pen to its original position for resetting the electrical means so that the output voltage will again appear only after activation of the electrical means by the fixed number of pulses.

3. An apparatus for recording the intensity of radio-activity which comprises a chart, means for driving the chart at a constant speed, a pen, means for moving the pen transversely to the chart, a detector for the radio-activity, an amplifier connected to the output of the detector, electrical means connected with the amplifier for delivering after setting an output voltage only after activation by a fixed number of pulses from the detector, means for initiating the movement of the pen simultaneously with the initiation of said electrical means, means for stopping the movement of the pen responsive to the delivery of said output voltage, means for returning the pen to its original position and means responsive to the return of the pen to its original position to reset said electrical means so that said output voltage will again appear only after activation of said electrical means by said fixed number of pulses.

4. An apparatus for recording the intensity of radio-activity which comprises a chart, means for driving the chart at a constant speed, a pen, means for moving the pen transversely to the chart, a detector for the radio-activity, electrical means connected with the detector for delivering after setting an output voltage only after activation by a fixed number of pulses from the detector, means for initiating the movement of the pen at a predetermined time interval after the initiation of said electrical means, means for stopping the movement of the pen responsive to the delivery of said output voltage, means for returning the pen to its original position and automatic means operable after the return of the pen to its original position to reset said electrical means so that said output voltage will again appear only after activation of said electrical means by said fixed number of pulses.

ALEXANDER WOLF.

REFERENCES CITED

The following references are of record in the file of this patent:

UNITED STATES PATENTS

| Number | Name | Date |
|---|---|---|
| 672,123 | Delaney | Apr. 16, 1901 |
| 1,104,307 | McLean | July 21, 1914 |
| 1,961,170 | Robinson | June 5, 1934 |
| 2,108,037 | Au | Feb. 15, 1938 |
| 2,181,728 | Greentree | Nov. 28, 1939 |
| 2,390,178 | Rutherford | Dec. 4, 1945 |
| 2,485,730 | Giffen et al. | Oct. 25, 1949 |

FOREIGN PATENTS

| Number | Country | Date |
|---|---|---|
| 382,664 | Great Britain | October 1932 |